United States Patent
Wege et al.

[11] Patent Number: 6,012,777
[45] Date of Patent: Jan. 11, 2000

[54] MOUNT FOR MOTOR-VEHICLE HEADREST

[75] Inventors: Lutz Wege, Solingen; Mathias Pätzold, Langenfeld; Jörg Teichmann, Lobenstein, all of Germany

[73] Assignee: Grammer Automotive GmbH, Amberg, Germany

[21] Appl. No.: 09/057,069

[22] Filed: Apr. 8, 1998

[30] Foreign Application Priority Data

Apr. 29, 1997 [DE] Germany ............................ 197 17 942

[51] Int. Cl.$^7$ .................................................. A47C 7/38
[52] U.S. Cl. .......................... 297/410; 297/391; 297/404
[58] Field of Search .................................. 297/410, 404, 297/391

[56] References Cited

U.S. PATENT DOCUMENTS

| | | | |
|---|---|---|---|
| 4,411,470 | 10/1983 | Nishimura et al. | 297/410 |
| 4,483,565 | 11/1984 | Terui et al. | 297/410 |
| 4,489,979 | 12/1984 | Zyngier | 297/410 X |
| 4,577,904 | 3/1986 | Wiese et al. | 297/410 |
| 4,604,777 | 8/1986 | Meeks | 297/410 X |
| 5,156,440 | 10/1992 | Vidwans | 297/410 |
| 5,308,430 | 5/1994 | Saito et al. | 156/307.1 |
| 5,437,450 | 8/1995 | Akatsuka et al. | 273/80 B |
| 5,529,379 | 6/1996 | Stöcker | 297/410 |
| 5,667,276 | 9/1997 | Connelly et al. | 297/410 |
| 5,685,783 | 11/1997 | Akatsuka et al. | 473/319 |
| 5,746,544 | 5/1998 | Baghoomian | 405/229 |
| 5,816,658 | 10/1998 | Wallis | 297/410 |

FOREIGN PATENT DOCUMENTS

| | | | |
|---|---|---|---|
| 0743222 | 11/1996 | European Pat. Off. | |
| 3422697 | 12/1985 | Germany | 297/391 |
| 3437803 | 6/1986 | Germany . | |
| 296 05 983 U | 7/1996 | Germany . | |

*Primary Examiner*—Peter M. Cuomo
*Assistant Examiner*—Rodney B. White
*Attorney, Agent, or Firm*—Herbert Dubno; Andrew Wilford

[57] ABSTRACT

A headrest mount has a rod having an upper end adapted to carry a headrest, extending along an axis, and formed with a plurality of axially spaced and radially outwardly open notches and a socket fitting having a tube in which the rod is axially centered and slidable and a head axially traversed by the rod and forming a slide compartment having upper and lower confronting planar surfaces extending generally perpendicular to the axis. A generally rectangular and wholly plastic slide plate in the slide compartment is formed with a central aperture through which the rod passes and has a pair of axially oppositely directed planar faces respectively engaging the surfaces of the compartment. The slide plate is a snug fit between the compartment surfaces. At least one spring engaged in the head between the plate and the fitting urges the plate radially of the axis and presses an edge of the aperture against the rod so that when one of the notches is aligned with the plate the edge engages therein and axially arrests the rod in the fitting.

9 Claims, 4 Drawing Sheets

MOUNT FOR MOTOR-VEHICLE HEADREST

FIELD OF THE INVENTION

The present invention relates to a mount for a motor-vehicle headrest. More particularly this invention concerns such a mounting assembly which allows the headrest's vertical position to be adjusted.

BACKGROUND OF THE INVENTION

As described in German patent 3,437,803 of E. Butz a motor-vehicle headrest is typically carried at the upper end of an upright rod that is vertically slidable in a sleeve mounted on a seat back or behind a seat back on a shelf. The rod is vertically displaceable in the sleeve so that the vertical position of the headrest cushion can be adjusted. To this end the rod is typically formed with a row of horizontally open and vertically spaced notches and a horizontally biased latch element provided in the sleeve can engage in these notches to arrest the headrest in respective vertically offset positions.

Normally the latch element is a metallic part that is pressed by a spring toward the metallic rod. Such a system is fairly strong but has two main disadvantages. First of all, it can rattle, something that is particularly annoying in a motor vehicle, in particular when the source of the rattle is located at head level. Furthermore as the headrest is adjusted, the mutually engaging parts are subjected to considerable wear so that with time the headrest becomes loose, making any rattle even worse, or the system fails altogether.

OBJECTS OF THE INVENTION

It is therefore an object of the present invention to provide an improved mount for a motor-vehicle headrest.

Another object is the provision of such an improved mount for a motor-vehicle headrest which overcomes the above-given disadvantages, that is which operates smoothly, does not with time generate a rattle, and that wears little, even with prolonged use.

SUMMARY OF THE INVENTION

A headrest mount has according to the invention a rod having an upper end adapted to carry a headrest, extending along an axis, and formed with a plurality of axially spaced and radially outwardly open notches and a socket fitting having a tube in which the rod is axially centered and slidable and a head axially traversed by the rod and forming a slide compartment having upper and lower confronting planar surfaces extending generally perpendicular to the axis. A generally rectangular and wholly plastic slide plate in the slide compartment is formed with a central aperture through which the rod passes and has a pair of axially oppositely directed planar faces respectively engaging the surfaces of the compartment. The slide plate is a snug fit between the compartment surfaces. At least one spring engaged in the head between the plate and the fitting urges the plate radially of the axis and presses an edge of the aperture against the rod so that when one of the notches is aligned with the plate the edge engages therein and axially arrests the rod in the fitting.

With this system, therefore, the entire plate is supported on planar surfaces except for that tiny edge portion that is engaged in the notch of the rod. As a result the system is quite strong. The snug fit completely eliminates any rattle between the fitting and the plate and the use of plastic reduces any rattle between the plate and the rod and also reduces relative wear of these parts.

The slide plate in accordance with the invention includes imbedded reinforcement. More particularly the reinforcement is fibers, typically carbon, to produce a very strong piece. In addition if necessary the slide plate is of a plastic with a low coefficient of surface friction, for instance an appropriate polyamide. Such a plastic plate can be machined to tight tolerances yet is much cheaper to manufacture than a composite metal/plastic plate as in above cited German 3,437,803.

According to a further feature of the invention at least one radially displaceable brake element mounted in the tube is radially engageable with the rod. Another spring urges the brake element radially against the rod. More particularly the tube is formed with a U-shaped cutout defining a radially deflectable tongue constituting the brake element. The spring embraces the tube and has an end bearing on the brake element. The brake element engages the rod about 90° offset from the notches thereof. For most effective damping of movement of the rod, the tube is formed with two such diametrically opposite cutouts each defining a respective such tongue each constituting a respective such brake element. The spring is generally C-shaped and has opposite ends engaging the brake elements and pressing them against opposite sides of the rod.

The central aperture according to the invention is generally rectangular and the plate has a pair of parallel legs extending in a slide direction and a pair of crosspieces bridging ends of the legs and extending perpendicular to the slide direction. The aperture has four straight edges and the compartment is generally rectangularly parallelepipedal. The legs have straight outer edges sliding on complementary inner faces of the compartment.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
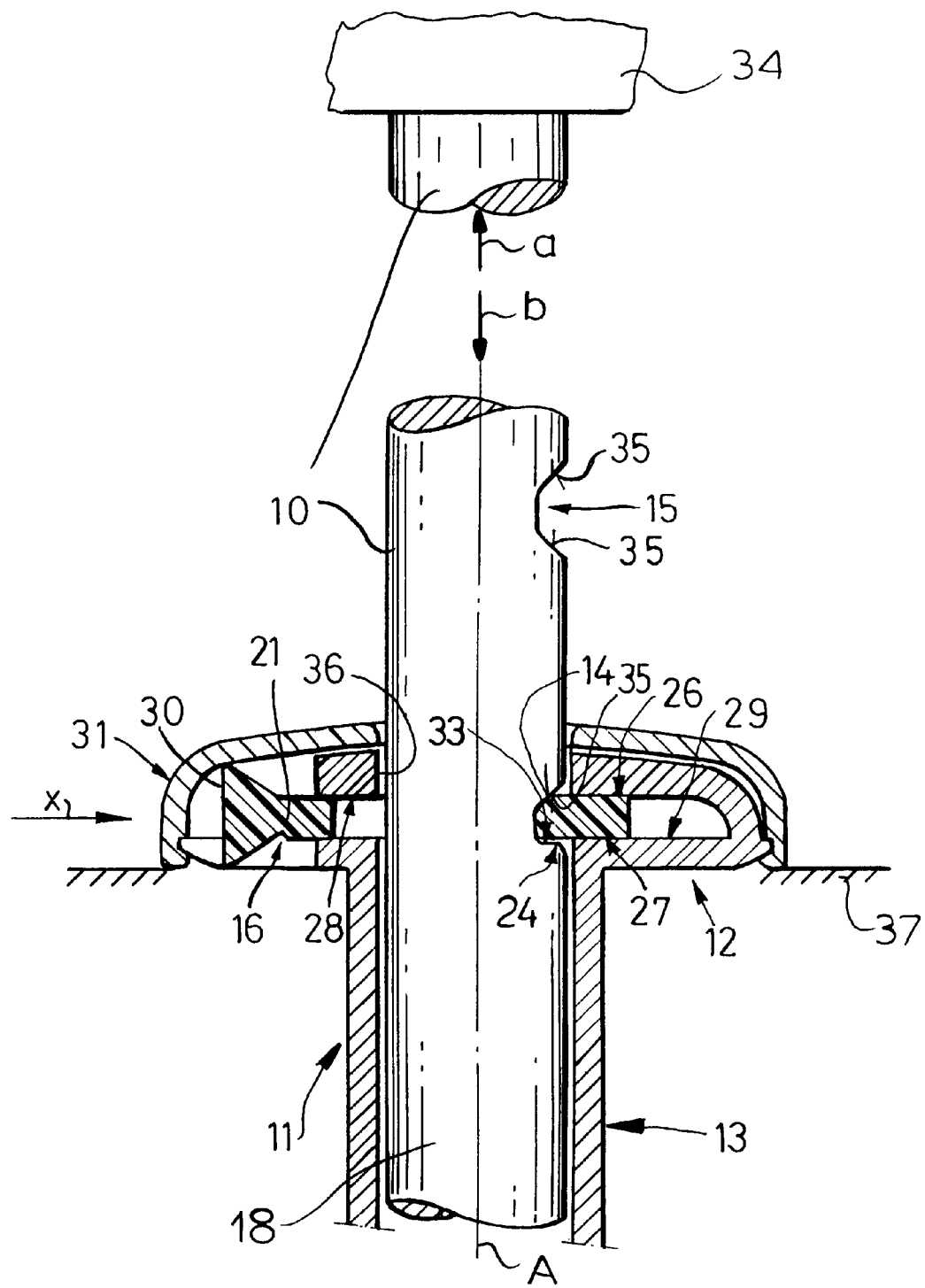
FIG. 1 and 2 are axial sections through the mount at 90° offset planes, FIG. 1 also diagrammatically indicating the headrest a-seat back.
Figure 2:
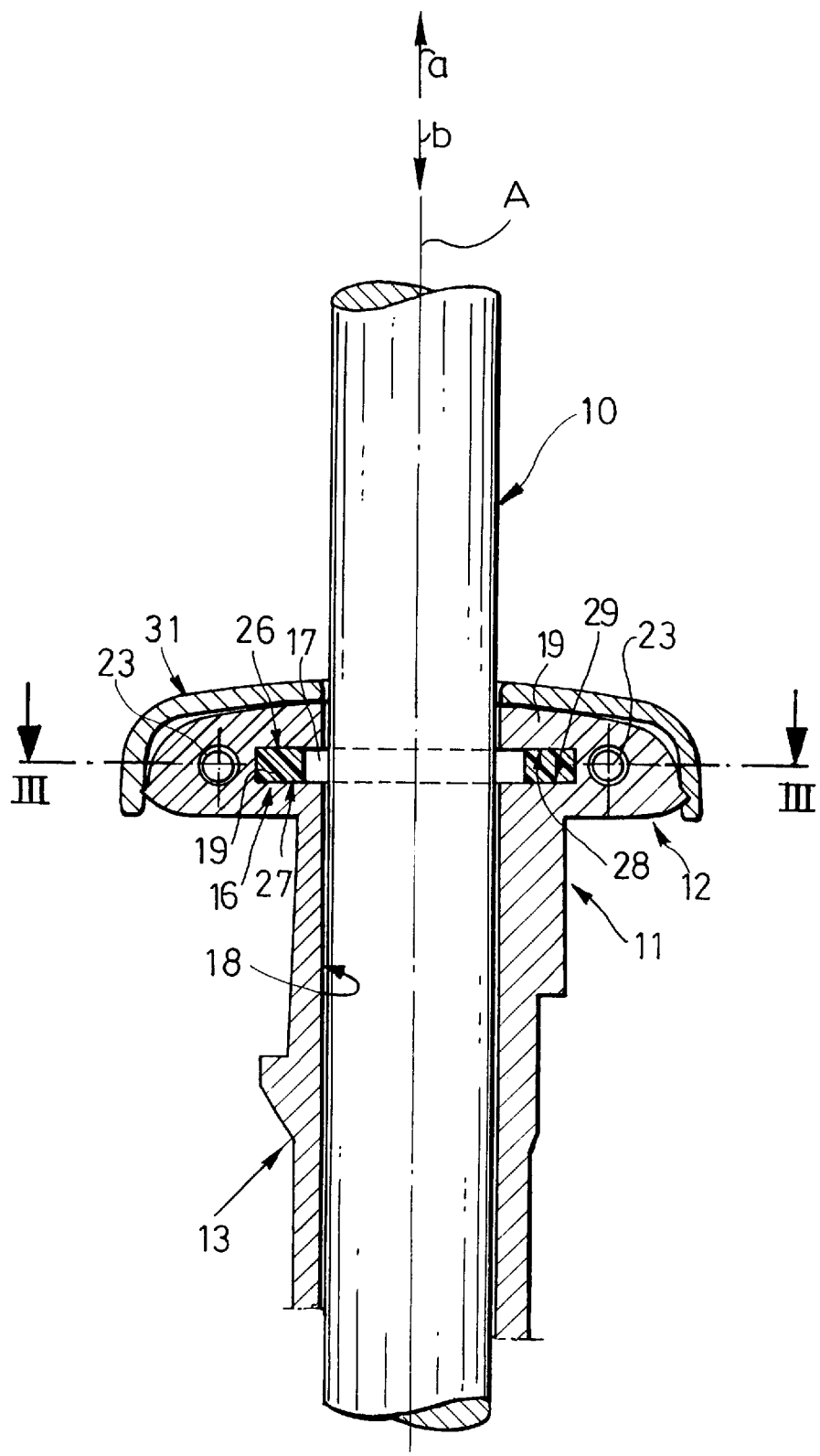

As seen in FIGS. 1, and 2, a mount according to the invention has a rod 10 and a socket fitting 11. The rod 10 has an outer surface 18 centered on an upright axis A and carries at its upper end a headrest shown partially at 34. The socket fitting 11 is set in a seat back shown schematically at 37 and is formed basically as a cylindrically tubular sleeve 13 in which the rod 10 can slide and a head 12 giving it a mushroom shape, with a cap 31 fitted over the head 12 to provide a decorative finish. The rod 10 is formed with a lower end notch 14 and with a plurality of positioning notches 15 of which only one is shown.

Figure 3A:
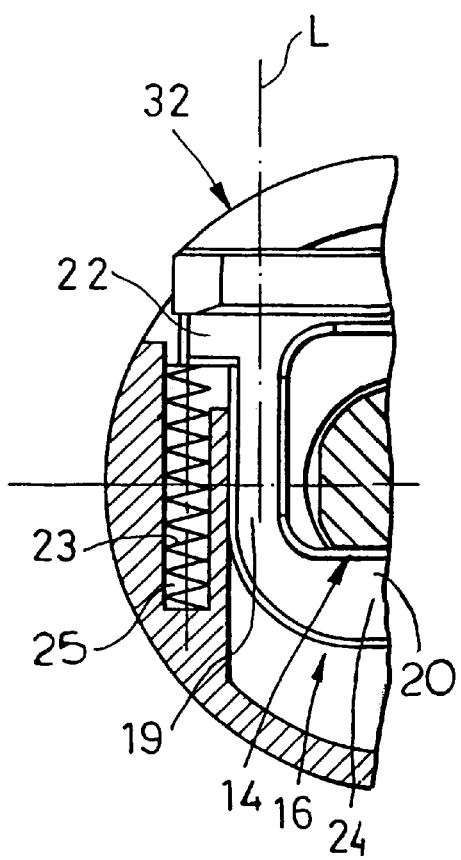
FIGS. 3A and 3B are sections taken along line III—III of FIG. 2 with FIG. 3A showing a variant on the arrangement of the invention and FIG. 3B showing the system of FIGS. 1 and 2.
Figure 3B:
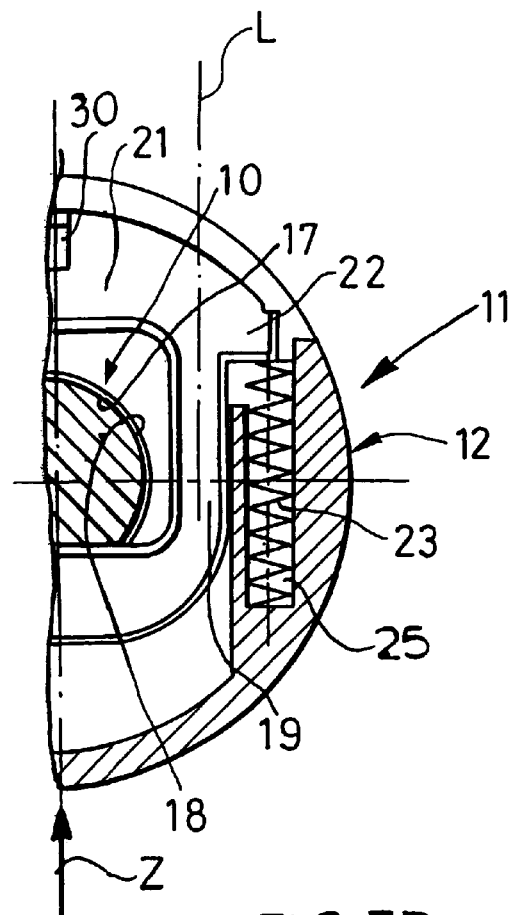

Inside the head 12 as best shown in FIG. 3A and 3B is a locking member 16 formed as a flat carbon-fiber reinforced polyamide plate having a central generally rectangular hole 17 through which the rod 10 passes and defined by a pair of parallel legs 19 extending in a sliding direction indicated by dot-dash lines L and bridged at one side by a crosspiece 20 engageable in the notches 14 and 15 and at the other side by a crosspiece 21. Tabs 22 projecting laterally from the crosspiece 21 engage outer ends of compression springs 23 seated in compartments 25 in the head 12 and urging the plate 16 parallel to the lines L in the direction z, that is with the crosspiece 20 engaged in one of the notches 14 or 15 and an edge 24 of the crosspiece 20 directly engaging the rod 10 at the base of the notch 14 or 15.

According to the invention the plastic latching plate 16 has parallel upper and lower faces 26 and 27 that flatly and continuously engage respective lower and upper faces 28 and 29 of the head 12. The upper wall of the head 12 is formed with a circular hole 36 so that only that small portion of the edge 24 that projects into the notch 14 or 15 is unsupported. The tight fit of this plastic plate 16 in the plastic body of the head 12 ensures that the system will never rattle, and the fact that both parts are made of plastic eliminates the possibility that they will corrode and stick together, as metal parts can. The slidable latch plate 16 can have as shown in FIG. 3A an externally actuatable button 32 exposed through a window in the cap 31 and allowing it to be pushed in manually or, as shown in FIG. 3B, a thickened end as shown at 30 which serves to limit the axial sliding of the plate 16 and for manual actuation of the slide plate 16, as for instance to remove the headrest completely. The notch 14 serves as an end stop and to this end has a lower flank 33 extending perpendicular to the axis A and an upper flank 35 extending at an acute angle thereto so it can cam out the plate 16 only when moving in direction a. The notches 15 have two such angled flanks 35 so the plate 16 can be cammed out regardless of which direction a or b the rod 10 is moving.

Figure 4:
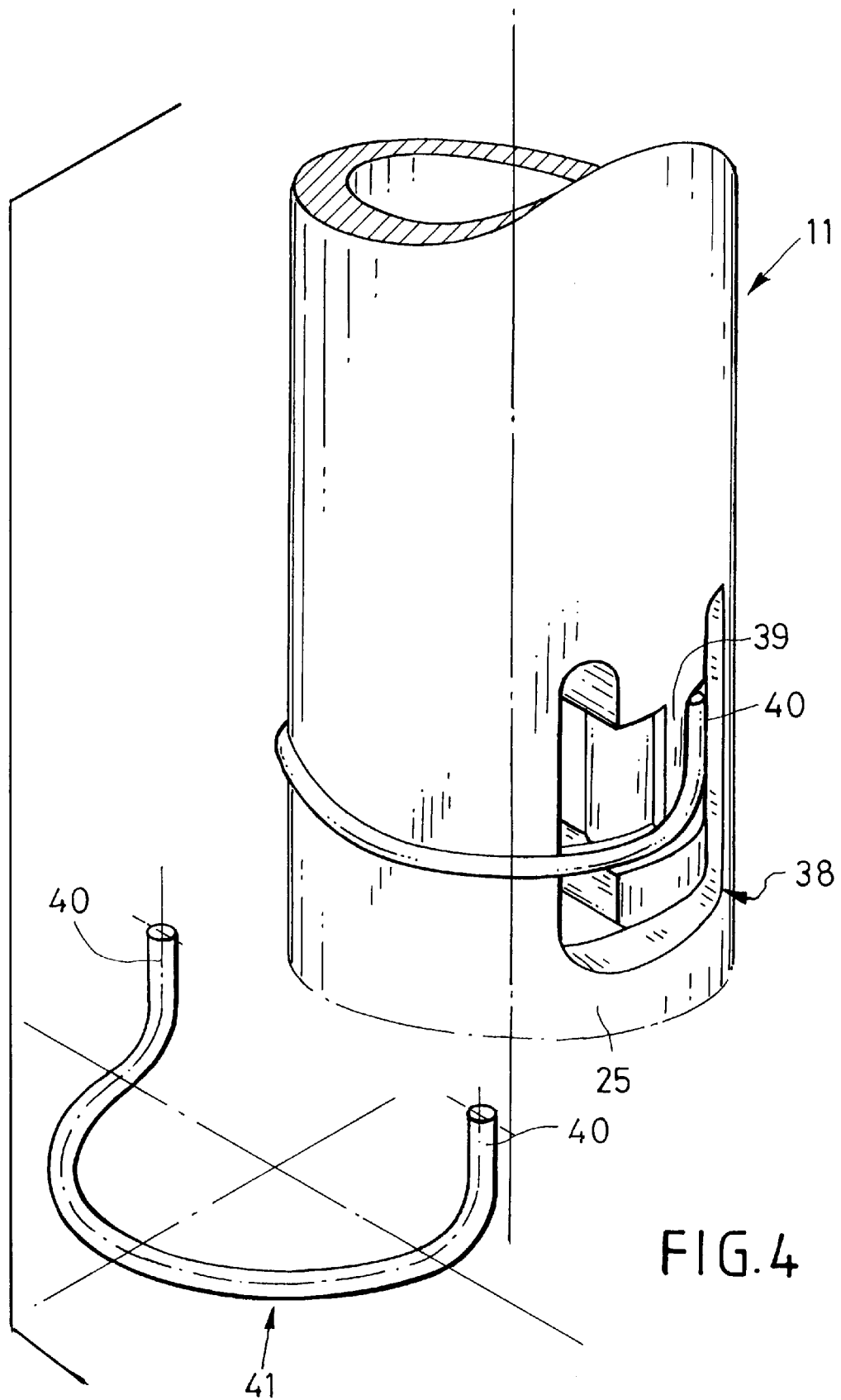
FIG. 4 is a perspective view of a lower part of the mount, with an extra biasing spring shown adjacent the mount for clarity of view.

As shown in FIG. 4 each side the tubular part 13 of the socket fitting 11 is formed with a generally U-shaped cutout 38 leaving an inwardly deflectable wall part or tongue acting as a brake element 39 that is pressed radially inward by a bent-up end 40 of a spring 41 lying against an outer surface 25 of the tube 13. Thus these braking tongues 39 are pressed radially inward against the outer surface 18 of the cylindrical rod 10, thereby braking axial movement of this rod 10 and eliminating any looseness of the rod 10 in the socket fitting 11.

We claim:

1. A headrest mount comprising:
    a rod having an upper end adapted to carry a headrest, extending along an axis, and formed with a plurality of axially spaced and radially outwardly open notches;
    a socket fitting having a tube in which the rod is axially centered and slidable and a head axially traversed by the rod and forming a slide compartment having upper and lower confronting planar surfaces extending generally perpendicular to the axis;
    a generally rectangular and wholly plastic slide plate in the slide compartment, formed with a central aperture through which the rod passes, and having a pair of axially oppositely directed planar faces respectively engaging the surfaces of the compartment, the slide plate being a snug fit between the compartment surfaces;
    at least one spring engaged in the head between the plate and the fitting urging the plate radially of the axis and pressing an edge of the aperture against the rod, whereby when one of the notches is aligned with the plate the edge engages therein and axially arrests the rod in the fitting;
    at least one radially displaceable brake element mounted in the tube and radially engageable with the rod; and
    spring means urging the brake element radially against the rod.

2. The headrest mount defined in claim 1 wherein the tube is formed with a U-shaped cutout defining a radially deflectable tongue constituting the brake element, the spring means including a spring embracing the tube and having an end bearing on the brake element.

3. The headrest mount defined in claim 2 wherein the brake element engages the rod about 90° offset from the notches thereof.

4. The headrest mount defined in claim 3 wherein the tube is formed with two such diametrically opposite cutouts each defining a respective such tongue each constituting a respective such brake element, the spring of the spring means having opposite ends engaging the brake elements.

5. A headrest mount comprising:
    a rod having an upper end adapted to carry a headrest, extending along an axis, and formed with a plurality of axially spaced and radially outwardly open notches;
    a socket fitting having a tube in which the rod is axially centered and slidable and a head axially traversed by the rod and forming a slide compartment having upper and lower confronting planar surfaces extending generally perpendicular to the axis;
    a generally rectangular and wholly plastic slide plate in the slide compartment, formed with a generally rectangular central aperture through which the rod passes, and having a pair of axially oppositely directed planar faces respectively engaging the surfaces of the compartment, the slide plate being a snug fit between the compartment surfaces the plate further having a pair of parallel legs extending in a slide direction and a pair of cross-pieces bridging ends of the legs and extending perpendicular to the slide direction, the aperture having four straight edges; and
    at least one spring engaged in the head between the plate and the fitting urging the plate radially of the axis and pressing an edge of the aperture against the rod, whereby when one of the notches is aligned with the plate the edge engages therein and axially arrests the rod in the fitting.

6. The headrest mount defined in claim 5 wherein the compartment is generally rectangularly parallelepipedal and the legs have straight outer edges sliding on complementary inner faces of the compartment.

7. The headrest mount defined in claim 5 wherein the slide plate includes imbedded reinforcement.

8. The headrest mount defined in claim 7 wherein the reinforcement is fibers.

9. The headrest mount defined in claim 5 wherein the slide plate is of a plastic with a low coefficient of surface friction.

* * * * *